(12) United States Patent
Kowalchuk

(10) Patent No.: US 12,069,980 B2
(45) Date of Patent: Aug. 27, 2024

(54) SEED OPENER HAVING A SINGULATION TUBE INCORPORATED WITHIN

(71) Applicant: CNH Industrial Canada, Ltd., Saskatoon (CA)

(72) Inventor: Trevor Lawrence Kowalchuk, Saskatoon (CA)

(73) Assignee: CNH Industrial Canada, Ltd. (CA)

( * ) Notice: Subject to any disclaimer, the term of this patent is extended or adjusted under 35 U.S.C. 154(b) by 925 days.

(21) Appl. No.: 17/122,334

(22) Filed: Dec. 15, 2020

(65) Prior Publication Data
US 2022/0183219 A1 Jun. 16, 2022

(51) Int. Cl.
| | |
|---|---|
| *A01C 7/06* | (2006.01) |
| *A01C 5/06* | (2006.01) |
| *A01C 7/04* | (2006.01) |
| *A01C 7/20* | (2006.01) |

(52) U.S. Cl.
CPC ............. *A01C 7/06* (2013.01); *A01C 5/062* (2013.01); *A01C 7/042* (2013.01); *A01C 7/206* (2013.01)

(58) Field of Classification Search
CPC .......... A01C 7/06; A01C 7/042; A01C 7/102; A01C 7/206; A01C 5/062
USPC ...................................................... 111/129
See application file for complete search history.

(56) References Cited

U.S. PATENT DOCUMENTS

| | | | | |
|---|---|---|---|---|
| 2,784,530 | A | * 3/1957 | Dugan | A01C 23/024 422/256 |
| 2,843,067 | A | * 7/1958 | Dugan | B01F 25/313 62/119 |
| 2,905,117 | A | * 9/1959 | Dugan | A01C 23/024 111/129 |
| 4,116,139 | A | * 9/1978 | Sauer | A01C 23/025 111/155 |
| 4,721,047 | A | 1/1988 | Stauch | |
| 4,762,075 | A | 8/1988 | Caixin et al. | |
| 5,161,473 | A | * 11/1992 | Landphair | B65G 53/42 222/630 |
| 5,379,706 | A | * 1/1995 | Gage | A01C 15/04 406/146 |
| 5,850,790 | A | 12/1998 | Sal Te et al. | |
| 6,453,832 | B1 | * 9/2002 | Schaffert | A01C 7/201 111/164 |
| 6,668,738 | B2 | * 12/2003 | Lee | A01C 7/042 111/175 |
| 7,096,805 | B1 | 8/2006 | Wiesenburger | |

(Continued)

FOREIGN PATENT DOCUMENTS

| | | |
|---|---|---|
| CN | 1759649 | 4/2006 |
| CN | 201072900 | 6/2008 |

(Continued)

*Primary Examiner* — Jamie L McGowan
(74) *Attorney, Agent, or Firm* — Rebecca Henkel; Rickard K. DeMille; Peter K. Zacharias

(57) ABSTRACT

An opener configured to be coupled to an agricultural implement includes a first passage configured for pneumatic delivery of a first agricultural product. The first passage is defined by a first wall. The first passage includes a first outlet for the first agricultural product. The opener also includes a second passage configured for singulated delivery of a second agricultural product. The second passage is defined by a second wall. The second wall of the second passage is disposed within the first wall of the first passage.

20 Claims, 6 Drawing Sheets

(56) References Cited

U.S. PATENT DOCUMENTS

| | | | |
|---|---|---|---|
| 7,523,709 B1* | 4/2009 | Kiest | A01C 5/062 111/119 |
| 7,568,438 B2 | 8/2009 | Arksey | |
| 7,900,568 B2* | 3/2011 | Senchuk | A01C 5/062 111/119 |
| 8,146,519 B2* | 4/2012 | Bassett | A01C 5/064 111/163 |
| 8,322,293 B2 | 12/2012 | Wollenhaupt et al. | |
| 8,931,423 B2* | 1/2015 | Wickstrom | A01B 49/06 111/124 |
| 9,374,943 B1* | 6/2016 | Kile | A01C 5/062 |
| 9,414,538 B1* | 8/2016 | Nelson | A01C 23/025 |
| 9,451,740 B2 | 9/2016 | Kowalchuk | |
| 11,134,605 B1* | 10/2021 | Pirani | A01C 7/163 |
| 2011/0315057 A1* | 12/2011 | Memory | A01C 5/062 111/152 |
| 2015/0319915 A1 | 11/2015 | Pfitzner | |
| 2015/0351315 A1* | 12/2015 | Wendte | A01C 19/02 111/183 |
| 2018/0332762 A1* | 11/2018 | Melanson | A01C 7/002 |
| 2019/0053419 A1* | 2/2019 | Schoeny | A01C 7/102 |
| 2019/0053421 A1* | 2/2019 | Schoeny | A01C 7/206 |
| 2020/0329629 A1* | 10/2020 | Corelli | A01C 7/102 |
| 2021/0253412 A1* | 8/2021 | Nolan | A01C 15/02 |
| 2022/0183219 A1* | 6/2022 | Kowalchuk | A01C 7/06 |
| 2023/0320257 A1* | 10/2023 | Johnson | A01C 7/082 |

FOREIGN PATENT DOCUMENTS

| | | |
|---|---|---|
| CN | 108781638 | 11/2018 |
| CN | 109156105 | 11/2018 |

\* cited by examiner

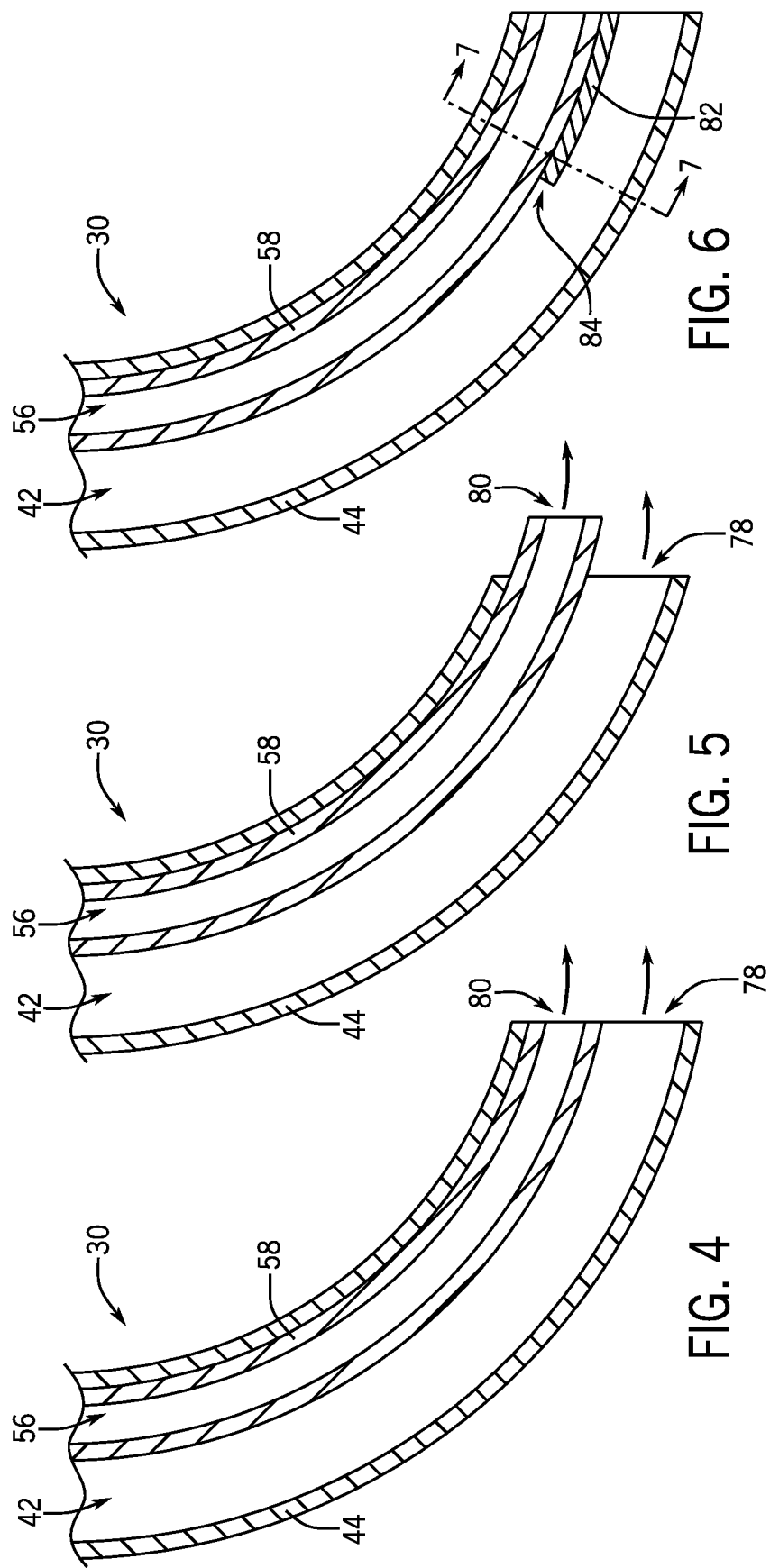

SEED OPENER HAVING A SINGULATION TUBE INCORPORATED WITHIN

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to an opener.

Generally, planting implements (e.g., planters or seed drills) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube or powered agricultural product conveyor) is configured to deposit agricultural products (e.g., seed, fertilizer) into the trench. The opener/agricultural product conveying system is followed by closing discs that move displaced soil back into the trench and/or a packer wheel that packs the soil on top of the deposited seeds/other agricultural products.

Each row unit of the planting implement may include an agricultural product meter (e.g., vacuum agricultural product meter, etc.) configured to control a flow rate of the agricultural product (e.g., seed/other agricultural product) to the opener or the agricultural product conveying system, thereby establishing a desired distribution of the agricultural product throughout the field. Typically, both the seed and the fertilizer are volumetrically delivered to the opener. However, singulation of seeds may be desired. However, current attempts to combine volumetric product (e.g., fertilizer) delivered by air with singulated product (e.g., seed) are subject to complexities that result in the pneumatically delivered fertilizer interfering with the singulation of the seed.

BRIEF DESCRIPTION

This brief description is provided to introduce a selection of concepts that are further described below in the detailed description. This summary is not intended to identify key or essential features of the claimed subject matter, nor is it intended to be used as an aid in limiting the scope of the claimed subject matter.

In a first embodiment, an opener configured to be coupled to an agricultural implement is provided. The opener includes a first passage configured for pneumatic delivery of a first agricultural product. The first passage is defined by a first wall. The first passage includes a first outlet for the first agricultural product. The opener also includes a second passage configured for singulated delivery of a second agricultural product. The second passage is defined by a second wall. The second wall of the second passage is disposed within the first wall of the first passage.

In a second embodiment, a singulation tube is provided. The singulation tube includes a first wall defining a first passage configured for singulated delivery of a first agricultural product. The singulation tube also includes a first outlet for the agricultural product. The singulation tube is configured for placement within a second wall defining a second passage configured for pneumatic delivery of a second agricultural product, and the second wall is part of an opener configured to be coupled to an agricultural implement. The second passage includes a second outlet for the second agricultural product. The first wall is configured to extend within the second passage so that the first outlet is at least flush with the second outlet.

In a third embodiment, a method is provided. The method includes providing an opener configured to be coupled to an agricultural implement, wherein the opener includes a first wall defining a first passage configured for pneumatic delivery of a first agricultural product, wherein the first passage includes a first outlet for the first agricultural product. The method also includes removably disposing a singulation tube within the first wall of the first passage, wherein the singulation tube includes a second wall defining a second passage configured for singulated delivery of a second agricultural product, and wherein the second passage includes a second outlet for the second agricultural product.

DRAWINGS

These and other features, aspects, and advantages of the present disclosure will become better understood when the following detailed description is read with reference to the accompanying drawings in which like characters represent like parts throughout the drawings, wherein:

FIG. 4 is a side cross-sectional view of an embodiment of a portion of an opener (e.g., having flush outlets);

FIG. 5 is a side cross-sectional view of an embodiment of a portion of an opener (e.g., having non-flush outlets);

FIG. 6 is a side cross-sectional view of an embodiment of a portion of an opener (e.g., having a singulation tube disposed within a socket);

DETAILED DESCRIPTION

Figure 1:
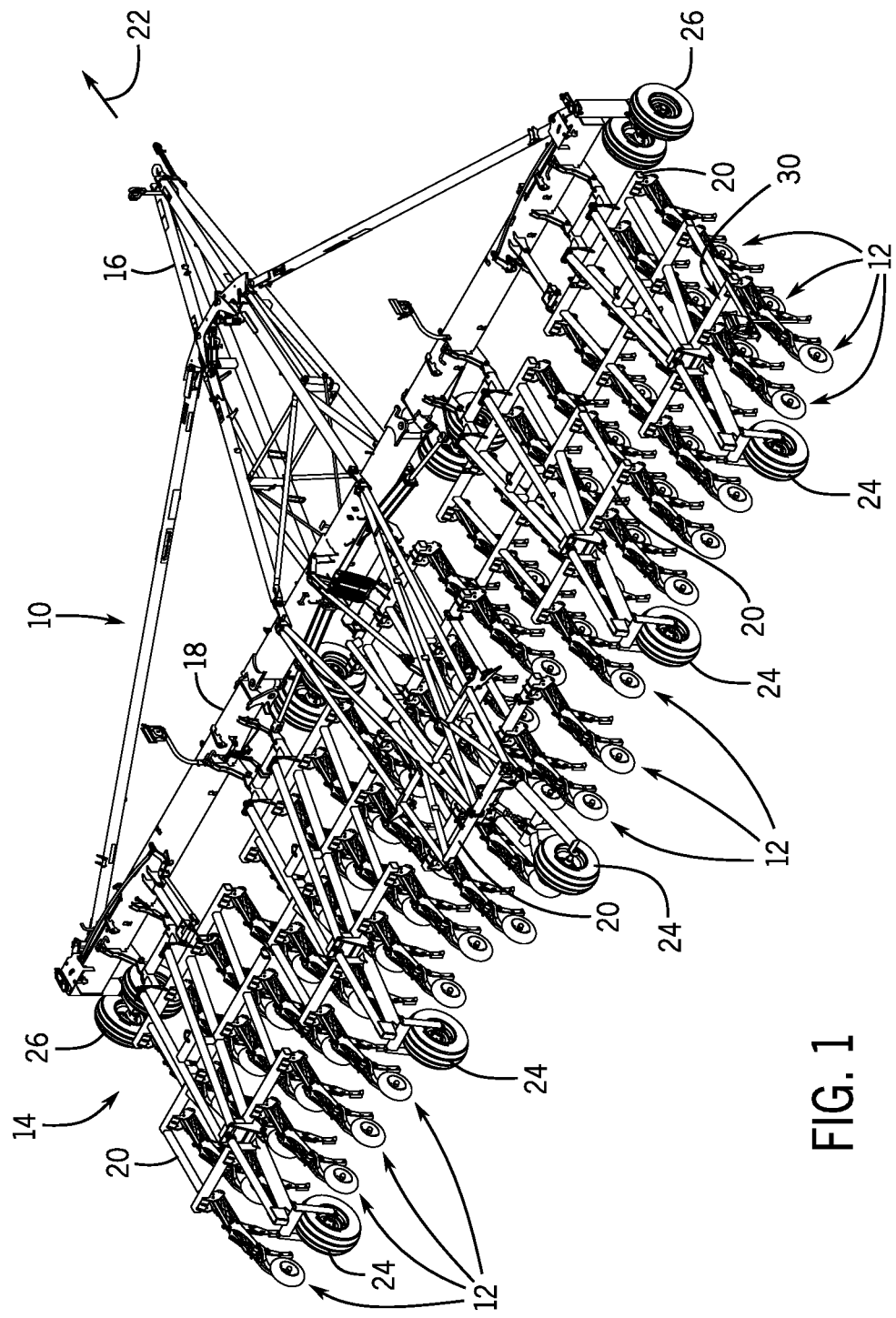
FIG. 1 is a perspective view of an embodiment of an agricultural implement having multiple singulating row units distributed throughout the agricultural implement.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Embodiments of the present disclosure relate generally to an opener (e.g., seed opener). In particular, the seed opener includes a passage (e.g., singulation tube) for singulated delivery of seed (e.g., canola, wheat, etc.) disposed within a passage (e.g., tube) for pneumatic delivery of fertilizer. The length of wall of the singulation tube is long enough to keep the pneumatic delivery of the fertilizer from affecting the singulated delivery of the seed. In certain embodiments, the exit of the singulation tube is flush with an exit of the passage for the fertilizer. In other embodiments, the exit of singulation extends beyond the exit of the passage for the fertilizer. The singulation tube may be removably disposed within or coupled to the passage for the fertilizer. The present disclosure enables the combining of the pneumatically delivery (via air) of volumetric product (e.g., fertilizer) with singulated product (e.g., seed) without disrupting the singulation effort.

FIG. 1 is a perspective view of an embodiment of an agricultural implement 10 having multiple singulating row units 12 distributed throughout the agricultural implement 10. In the illustrated embodiment, the agricultural implement includes a frame 14 having a hitch assembly 16, a toolbar 18, and tool frames 20. The hitch assembly 16 is configured to couple to a hitch of a work vehicle (e.g., a tractor) to enable the work vehicle to move the agricultural implement 10 along a direction of travel 22. The hitch assembly 16 is coupled to the toolbar 18, and the toolbar 18 is coupled to the tool frames 20. As illustrated, each tool frame 20 is supported by a respective wheel 24, and the toolbar 18 is supported by multiple wheels 26. In certain embodiments, each tool frame is rotatably coupled to the toolbar to enable the tool frame to follow contours of the soil surface. In the illustrated embodiment, each singulating row unit 12 is coupled to a frame element of a tool frame 20, thereby coupling each singulating row unit 12 to the frame 14 of the agricultural implement 10. While the illustrated agricultural implement frame 14 includes the toolbar 18 and the tool frames 20, in other embodiments, the frame may include other and/or additional frame elements to support the singulating row units. For example, in certain embodiments, the tool frames may be omitted, and the singulating row units may be directly coupled to the toolbar.

Each row unit 12 may include one or more openers (e.g., seed openers) configured to form a seed path (e.g., trench) within soil of a field. The row unit 12 may also include an agricultural product conveying system (e.g., seed tube or powered agricultural product conveyer) configured to deposit seeds and/or other agricultural product(s) (e.g., fertilizer) into the seed path/trench.

As discussed in detail below, each singulating row unit 12 includes one or more openers, where the opener includes a product tube or singulation tube disposed within the opener. The product tube is configured to receive the substantially singulated particles of an agricultural product (e.g., seed such as for canola, wheat, etc.) from the singulating meter and to direct the substantially singulated particles toward/into the trench. The product tube is disposed within a passage for the volumetric delivery (e.g., pneumatic delivery) of another agricultural product (e.g., volumetric seed or fertilizer (e.g., low nitrogen and phosphorous fertilizer). Disposing the singulation tube within the passage for the volumetric delivery keeps the volumetric delivery (e.g., via air) of an agricultural product from interfering with the singulation delivery of another agricultural product.

Figure 2:
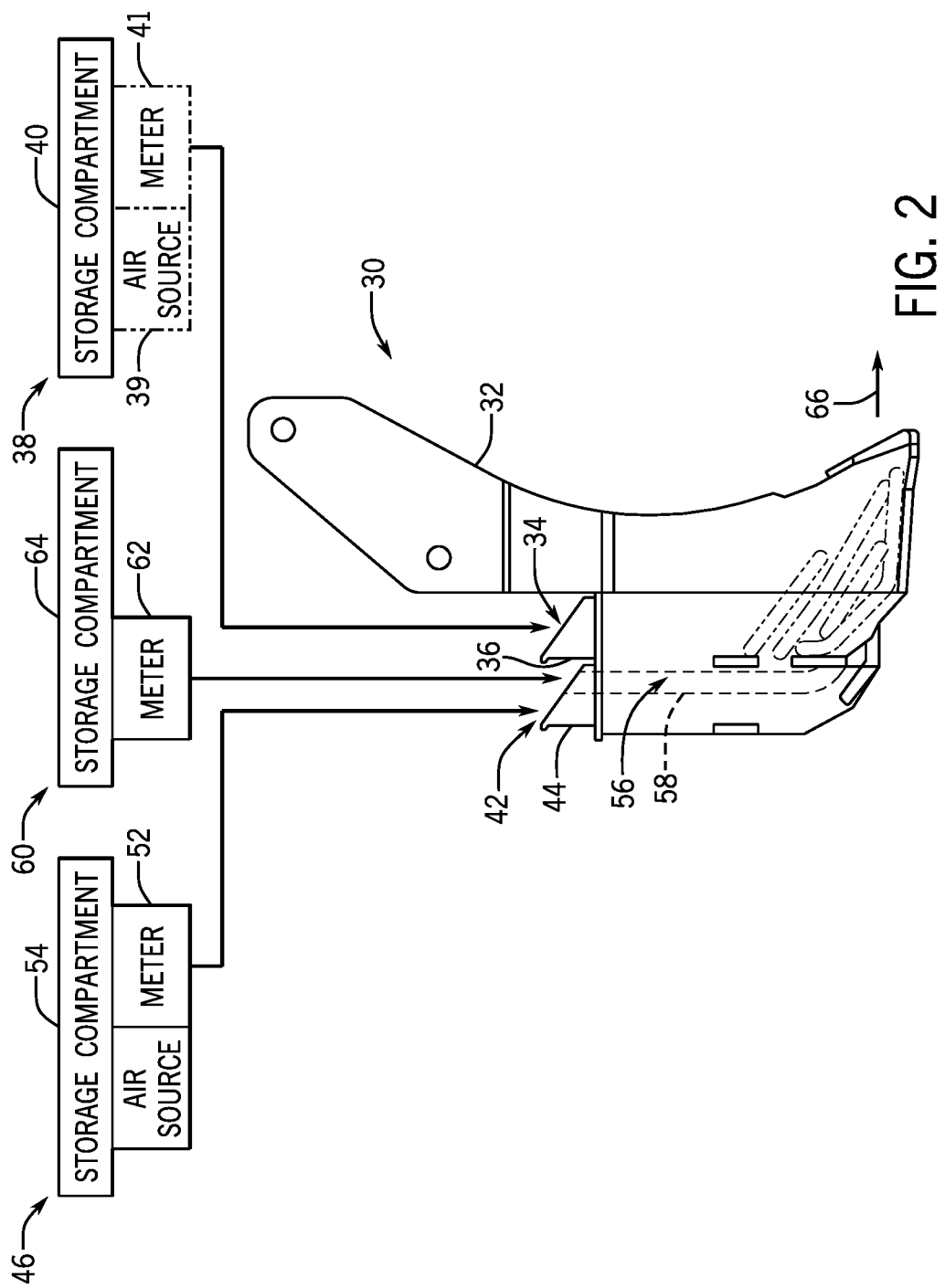
FIG. 2 is a schematic diagram of an embodiment of an opener having a singulation tube disposed within and the opener coupled to multiple delivery systems for agricultural products.

FIG. 2 is a schematic diagram of an embodiment of an opener 30 (e.g., seed opener) having a singulation tube disposed within and the opener coupled to multiple delivery systems for agricultural products. The opener 30 is configured to couple to an agricultural implement (e.g., air cart, seed drill, etc.). As depicted, the opener 30 includes a shank 32 configured to engage the soil to form a seed path. The opener 30 also includes a passage 34 (e.g., tubular passage) defined by a wall 36 for the delivery of an agricultural product (e.g., high nitrogen fertilizer) to the soil. The agricultural product is delivered to the passage 34 via a delivery system 38 from a storage compartment 40 (e.g., located on the agricultural implement or could be delivered from the aircart). In some embodiments, the agricultural product delivered to the passage 34 may be metered in a volumetric manner. In certain embodiments, the delivery system 38 includes an air source 39 and a product meter 41 coupled to a distribution line. The product meter 41 (e.g., meter roller(s)) is configured to receive the agricultural product from the storage component 40 (e.g., located on the agricultural implement or could be supplied from an aircart) and to output metered (e.g., volumetrically metered) agricultural product to an airflow provided by the air source 39. The airflow fluidizes and directs the agricultural product through the distribution line to the passage 34.

The opener 30 also includes a passage 42 (e.g., tubular passage) defined by a wall 44 for the delivery (e.g., volumetric delivery) of an agricultural product (e.g., low nitrogen and phosphorous fertilizer or seed) to the soil. The volumetric delivered agricultural product is provided to the passage 42 via a delivery system 46 (pneumatically delivery system). The delivery system 46 includes an air source 50 and a product meter 52 coupled to a distribution line. The product meter 52 (e.g., meter roller(s)) is configured to receive the agricultural product from a storage component 54 (e.g., located on the agricultural implement or could be supplied from an aircart) and to output metered (e.g., volumetrically metered) agricultural product to an airflow provided by the air source 50. The airflow fluidizes and directs the agricultural product through the distribution line to the passage 42.

The opener 30 further includes a passage 56 (tubular passage or singulation tube) defined by a wall 58 (shown as a dashed line) for the delivery (singulated delivery) of an agricultural product (e.g., seed such as canola, wheat, etc.)

to the soil. The singulation tube 56 is disposed within the wall 44 of the passage 42 to keep the pneumatic delivery of the volumetric agricultural product from disrupting the delivery of the singulated agricultural product. The singulated agricultural product is provided to the passage 56 via a delivery system 60 (singulating delivery system). The delivery system 60 includes a singulating meter 62 that is configured to receive the agricultural product from a storage compartment 64 (e.g., located on the agricultural implement) and to provide the singulated agricultural product to the singulation tube 58. As described in greater detail below, the singulation tube 56 is removably coupled to the wall 44 of the passage 42 (and the opener 30).

Figure 3:
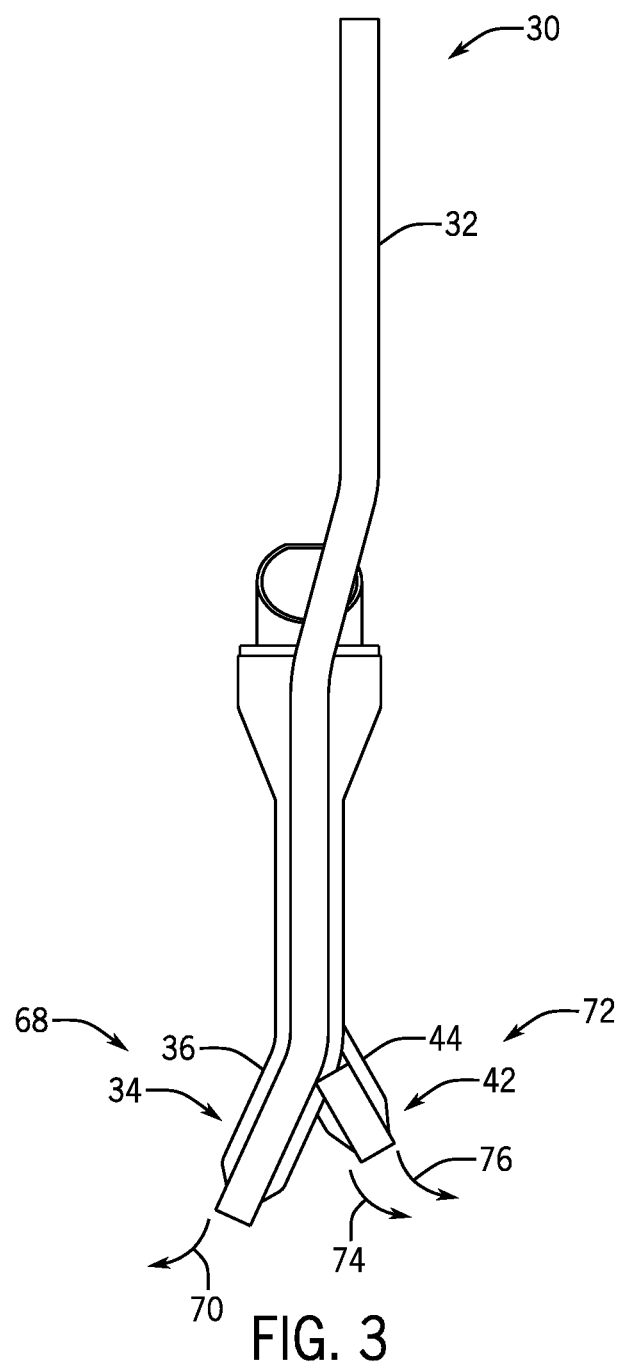
FIG. 3 is a front view of the opener in FIG. 2.

The tubular passage 42 (and thus the singulation tube 56) is physically separate from passage 34 via the walls 44, 36, thus, keeping the agricultural products from intermingling during conveyance through the passages 34, 42, 56 as shown in FIG. 3. As the opener 30 moves in a direction 66 (shown in FIG. 2), a first agricultural product (e.g., high nitrogen fertilizer) is delivered to a first side 68 of the opener 30 via the passage 34 as indicated by arrow 70 as shown in FIG. 3. Also, while the opener 30 moves in the direction 66, a second agricultural product (e.g., volumetric seed or low nitrogen and phosphorous fertilizer) and a third agricultural product (e.g., singulated seed such as canola, wheat, etc.) are delivered to a second side 72 (e.g., opposite the first side 68) of the opener 30 via the passage 42 (and the passage 56 within the passage 42) as indicated by arrows 74 and 76, respectively.

The length of the wall 58 of the singulation tube 56 keeps the pneumatic delivery of an agricultural product (e.g., low nitrogen and phosphorous fertilizer) from affecting the singulated delivery of another agricultural product (e.g., seed). FIGS. 4 and 5 are side cross-sectional views of a portion of the opener 30. As depicted in FIG. 4, the wall 58 of the passage 56 extends along a length of the passage 42 within the wall 44. The passage 42 has an outlet 78 for the pneumatically delivered agricultural product and the passage 56 has an outlet 80 for the singulated agricultural product. As depicted in FIG. 4, the outlets 78, 80 are flush with each other. As depicted in FIG. 5, the wall 58 of the passage 56 extends along the length of the passage 42 within the wall 44 and through the passage 42 so that the outlet 80 extends beyond the outlet 78.

Figure 7:
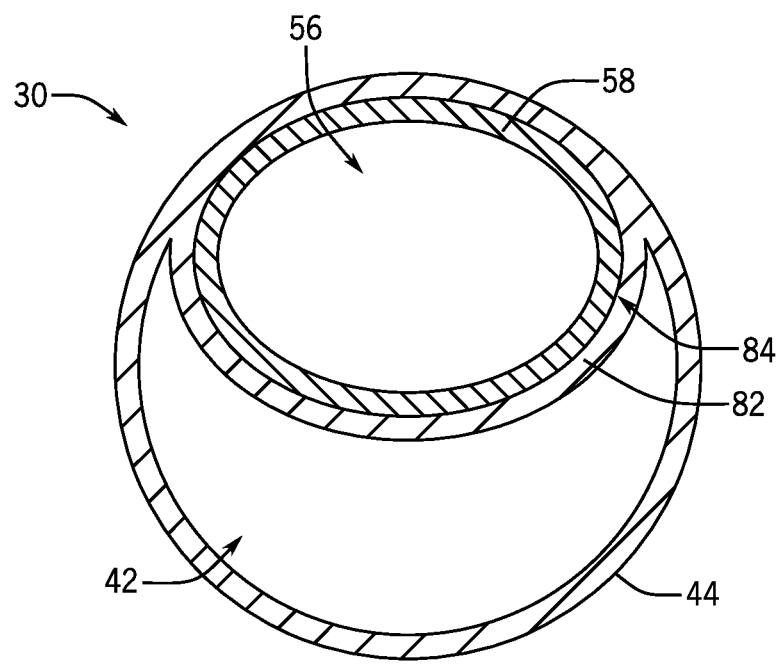
FIG. 7 is a top cross-sectional view of the portion of the opener, as taken along line 7-7 of FIG. 6.

In certain embodiments, the singulation tube 56 may be retrofittedly coupled to the wall 44 of the passage 42. In other embodiments, the opener 30 may be manufactured to include the singulation tube 56 within the wall 44 of the passage. In either case, the singulation tube 56 is configured to be removably disposed within and coupled to the wall 44 of the passage 42. FIGS. 6-9 depict different ways for the coupling to occur between the singulation tube 56 and the wall 44 of the passage 42. As depicted in FIGS. 6 and 7, a wall portion 82 extends from the wall 44 of the passage 42 to provide a cavity or socket 84 for receiving (e.g., via insertion) and securing the singulation tube 56. As depicted in FIG. 7, the wall portion 82 extends from one end of the wall 44 to another end of the wall 44. In certain embodiments, the wall portion 82 may not extend from one end of the wall 44 to another end of the wall 44 while defining the cavity or socket 84. In other embodiments, a first wall portion 82 may extend from one end of the wall 44 and a second wall portion 82 may extend from another end of the wall 44 to define the cavity or socket 84.

Figures 8, 9:
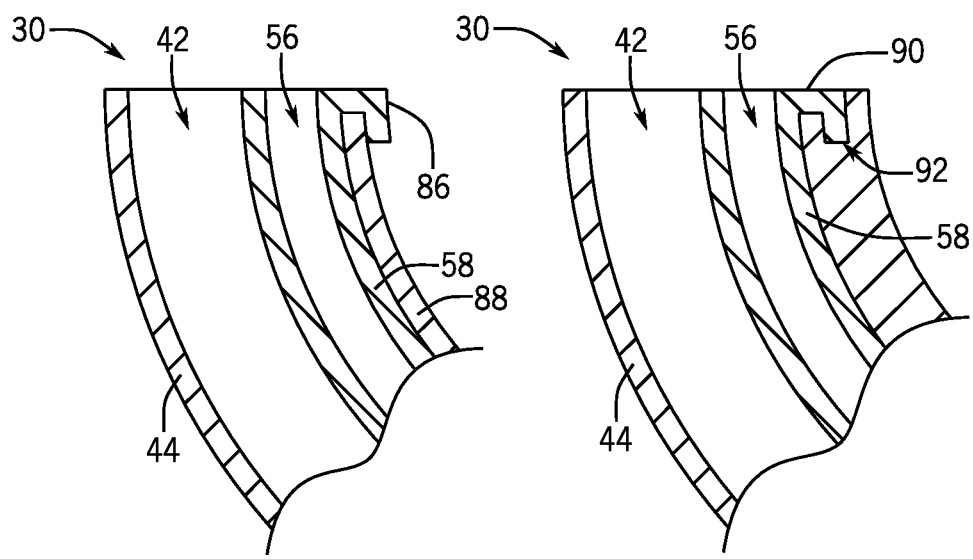
FIG. 8 is a side cross-sectional view of a portion of the opener (e.g., with a singulation tube having a clip)
FIG. 9 is a side cross-sectional view of a portion of the opener (e.g., with a singulation tube having a clip or tab)

As depicted in FIGS. 8 and 9, the singulation tube 56 is coupled to the wall 44 via a fastener. As depicted in FIG. 8, a top portion of the wall 58 of the passage 56 may include a clip portion or overhang 86 that is disposed over a top portion of the wall 44 and extends down an outer surface 88 of the wall 44 to secure the singulation tube 56 within the passage 42. Alternatively, as depicted in FIG. 9, the top portion of the wall 58 of the passage 56 may include a tab or clip portion 90 that fits within a recess 92 disposed on an inner surface of the wall 44. In certain embodiments, other types of fasteners or mechanisms may be utilized to couple and secure the singulation tube 56 to the wall 44 of the passage 42.

Figure 10:
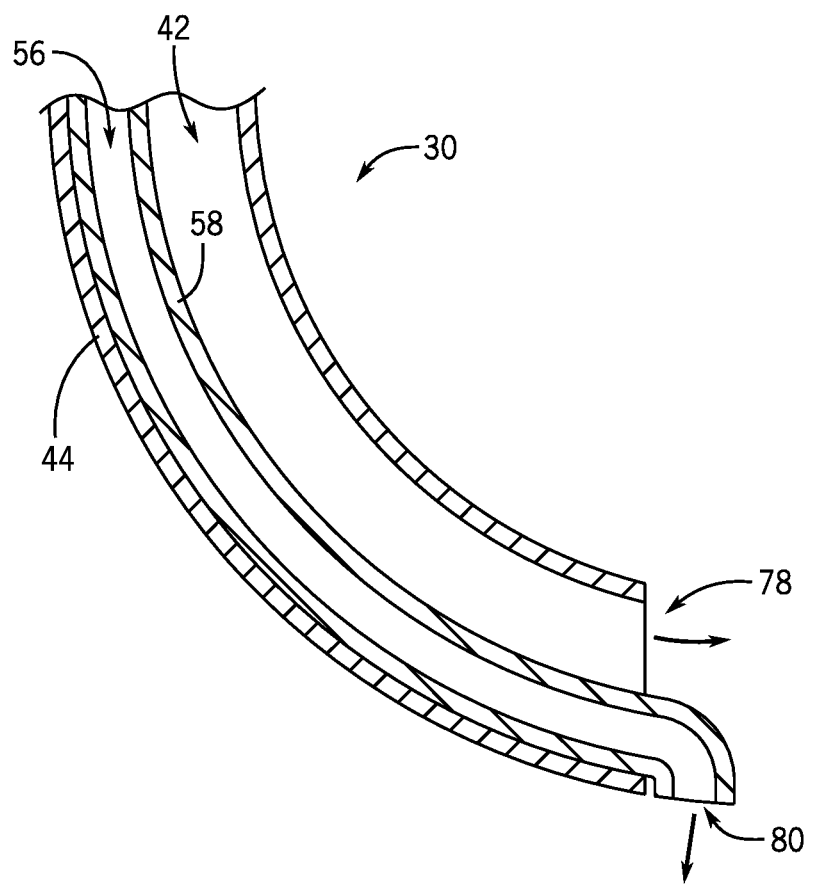
FIG. 10 is a side cross-sectional view of an embodiment of a portion of an opener (e.g., having non-flush outlets and a singulation tube disposed towards a rear of a passage it is disposed within).

In certain embodiments, as depicted in FIG. 10, the singulation tube 56 is disposed towards the rear of the passage 42 (as opposed to the front as depicted in FIGS. 4-6). As depicted in FIG. 10, the wall 58 of the passage or singulation tube 56 extends along the length of the passage 42 within the wall 44 and through the passage 42 so that the outlet 80 extends beyond the outlet 78. In addition, the portion of the wall 58 defining outlet 80 that extends beyond the outlet 78 bends towards the rear of the passage 42 away from the outlet 78 to further keep the air from the passage 42 affecting the singulated agricultural product (e.g., seed).

As used herein, the terms "inner" and "outer"; "up" and "down"; "upper" and "lower"; "upward" and "downward"; "above" and "below"; "inward" and "outward"; "forward" and "backward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An opener configured to be coupled to an agricultural implement, comprising:
   a first passage configured for pneumatic delivery of a first agricultural product, wherein the first passage is defined by a first wall, and the first passage comprises a first outlet for the first agricultural product; and
   a second passage configured for singulated delivery of a second agricultural product, wherein the second passage is defined by a second wall, and the second wall of the second passage is disposed within first wall of the first passage, wherein the second wall directly contacts the first wall.

2. The opener of claim 1, wherein the second passage comprises a second outlet for the second agricultural product defined by the second wall, and the second outlet is flush with the first outlet defined by the first wall.

3. The opener of claim 1, wherein the second passage comprises a second outlet for the second agricultural product, and the second outlet extends beyond the first outlet.

4. The opener of claim 1, wherein a length of the second wall is configured to keep the pneumatic delivery of the first agricultural product from affecting the singulated delivery of the second agricultural product.

5. The opener of claim 1, wherein the second wall of the second passage is configured to be removably disposed within the first wall of the first passage.

6. The opener of claim 5, wherein the second wall is configured to be removably and directly coupled to the first wall of the first passage.

7. The opener of claim 6, wherein the first wall defines a socket configured to receive and securely couple the second passage within the first passage.

8. The opener of claim 6, wherein the first wall and the second wall are removably and directly coupled to each other via a fastener.

9. The opener of claim 1, wherein the first passage comprises a first tube and the second passage comprises a second tube.

10. A singulation tube, comprising:
a wall defining a passage configured for singulated delivery of a first agricultural product; and
an outlet for the first agricultural product, wherein the singulation tube is configured for placement within an additional wall defining an additional passage configured for pneumatic delivery of a second agricultural product, and the additional wall is part of an opener configured to be coupled to an agricultural implement;
wherein the additional passage comprises an additional outlet for the second agricultural product, and the wall is configured to extend within the additional passage so that the outlet is at least flush with the additional outlet, wherein the wall directly contacts the additional wall.

11. The singulation tube of claim 10, wherein the wall is configured to extend within and through the additional passage so that the outlet extends beyond the additional outlet.

12. The singulation tube of claim 10, wherein a length of the wall is configured to keep the pneumatic delivery of the second agricultural product from affecting the singulated delivery of the first agricultural product.

13. The singulation tube of claim 10, wherein the wall of the passage is configured to be removably disposed within the additional wall of the additional passage.

14. The singulation tube of claim 13, wherein the wall is configured to be removably and directly coupled to the additional wall of the additional passage.

15. The singulation tube of claim 14, wherein the additional wall defines a socket configured to receive and securely couple the passage within the additional passage.

16. The singulation tube of claim 14, wherein the wall and the additional wall are removably and directly coupled to each other via a fastener.

17. A method, comprising:
providing an opener configured to be coupled to an agricultural implement, wherein the opener comprises a first wall defining a first passage configured for pneumatic delivery of a first agricultural product, wherein the first passage comprises a first outlet for the first agricultural product; and
removably disposing a singulation tube within the first wall of the first passage, wherein the singulation tube comprises a second wall defining a second passage configured for singulated delivery of a second agricultural product, and wherein the second passage comprises a second outlet for the second agricultural product, wherein the second wall directly contacts the first wall.

18. The method of claim 17, comprising removably disposing the singulation tube within the first wall of the first passage so that the second outlet is at least flush with the first outlet defined by the first wall.

19. The method of claim 18, comprising removably disposing the singulation tube within the first wall of the first passage so that the second outlet extends beyond the first outlet.

20. The method of claim 17, wherein the first agricultural product comprises fertilizer and the second agricultural product comprises seed.

* * * * *